(12) United States Patent
Kang et al.

(10) Patent No.: US 10,973,072 B2
(45) Date of Patent: Apr. 6, 2021

(54) METHOD AND DEVICE FOR CONTROLLING BEAMFORMING TRANSMISSION

(71) Applicant: Samsung Electronics Co., Ltd, Suwon-si (KR)

(72) Inventors: Jaewon Kang, Suwon-si (KR); Hojoong Kwon, Suwon-si (KR); Myungkwang Byun, Suwon-si (KR); Daekyu Shin, Suwon-si (KR); Seungjoo Maeng, Suwon-si (KR); June Moon, Suwon-si (KR); Myonghee Park, Suwon-si (KR); Kiseob Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/250,973

(22) Filed: Jan. 17, 2019

(65) Prior Publication Data

US 2019/0223247 A1     Jul. 18, 2019

(30) Foreign Application Priority Data

Jan. 17, 2018   (KR) ........................ 10-2018-0006229

(51) Int. Cl.
*H04W 76/18*     (2018.01)
*H04W 16/14*     (2009.01)
(Continued)

(52) U.S. Cl.
CPC .......... *H04W 76/18* (2018.02); *H04B 7/0408* (2013.01); *H04B 7/0617* (2013.01);
(Continued)

(58) Field of Classification Search
CPC .... H04W 76/18; H04W 16/14; H04B 7/0408; H04B 7/0617; H04L 5/0055
See application file for complete search history.

(56) References Cited

U.S. PATENT DOCUMENTS 9,042,323 B1 *   5/2015   Marupaduga ........ H04B 7/0408
                                                            370/329
2009/0225740 A1   9/2009   Ku et al.
(Continued)

FOREIGN PATENT DOCUMENTS

WO     2009/137092 A1    11/2009
WO     2013165149 A1     11/2013
(Continued)

OTHER PUBLICATIONS

ISA/KR, "International Search Report and Written Opinion of the International Searching Authority," Application No. PCT/KR2019/000654, dated Apr. 22, 2019, 7 pages.
(Continued)

*Primary Examiner* — Donald L Mills

(57)     ABSTRACT

The disclosure relates to a 5G or pre-5G communication system for supporting higher data transmission rates than 4G communication systems such as LTE systems. According to the disclosure, a method for performing beamforming by a base station in a wireless communication system comprises obtaining transmission time proportions allocated to a plurality of beam directions and performing beamforming to send control information in the plurality of beam directions based on the obtained transmission time proportions. A base station configured to perform beamforming in a wireless communication system, includes a transceiver configured to perform beamforming communication with a UE, and a processor configured to obtain transmission time proportions allocated to each of a plurality of beam directions, and
(Continued)

control beamforming for sending control information based on the obtained transmission time proportions.

18 Claims, 18 Drawing Sheets

(51) Int. Cl.
    *H04L 5/00* (2006.01)
    *H04B 7/0408* (2017.01)
    *H04B 7/06* (2006.01)
    *H04L 1/00* (2006.01)

(52) U.S. Cl.
    CPC .......... *H04L 5/0055* (2013.01); *H04W 16/14* (2013.01); *H04L 1/00* (2013.01); *H04L 5/0048* (2013.01)

(56) References Cited

U.S. PATENT DOCUMENTS

| | | | |
|---|---|---|---|
| 2011/0065448 A1* | 3/2011 | Song | H04B 7/0408 455/452.2 |
| 2011/0085448 A1 | 4/2011 | Kuwahara | |
| 2011/0223922 A1 | 9/2011 | Kiiski et al. | |
| 2012/0244878 A1 | 9/2012 | Cho et al. | |
| 2013/0235807 A1* | 9/2013 | Lee | H04W 16/28 370/329 |
| 2016/0021550 A1* | 1/2016 | Bhanage | H04W 16/28 370/312 |
| 2017/0033904 A1* | 2/2017 | Stirling-Gallacher | H04L 5/0048 |
| 2017/0238316 A1* | 8/2017 | Li | H04W 72/048 370/329 |
| 2017/0346535 A1* | 11/2017 | Islam | H04B 7/0621 |
| 2018/0124765 A1* | 5/2018 | Luo | H04B 7/0413 |
| 2018/0199161 A1* | 7/2018 | Deora | H04W 4/029 |
| 2018/0376501 A1* | 12/2018 | John Wilson | H04W 72/0446 |
| 2019/0037423 A1* | 1/2019 | Yu | H04W 74/0833 |
| 2019/0363910 A1* | 11/2019 | Ugurlu | H04L 5/0051 |
| 2019/0394805 A1* | 12/2019 | Kim | H04W 74/08 |
| 2020/0037274 A1* | 1/2020 | Pan | H04W 68/005 |

FOREIGN PATENT DOCUMENTS

| | | |
|---|---|---|
| WO | 2014/098542 A1 | 6/2014 |
| WO | 2017083514 A1 | 5/2017 |

OTHER PUBLICATIONS

Supplementary European Search Report dated Jul. 31, 2020 in connection with European Patent Application No. 1974 0847, 8 pages.

* cited by examiner

METHOD AND DEVICE FOR CONTROLLING BEAMFORMING TRANSMISSION

CROSS-REFERENCE TO RELATED APPLICATIONS

This application is based on and claims priority under 35 U.S.C. § 119 to Korean Patent Application No. 10-2018-0006229 filed on Jan. 17, 2018 in the Korean Intellectual Property Office, the disclosure of which is incorporated by reference herein in its entirety.

BACKGROUND

1. Field

The disclosure concerns beamforming technology for broadband wireless communication devices with multiple transmit antennas.

2. Description of Related Art

In order to meet the demand for wireless data traffic soaring since 4G communication systems came to the market, there have been ongoing efforts to develop enhanced 5G communication systems or pre-5G communication systems. For this reason, 5G communication systems or pre-5G communication systems are called beyond 4G network communication systems or post LTE systems.

For higher data transmit rates, 5G communication systems are implemented on ultra high frequency bands (mmWave), such as, e.g., 60 GHz. To mitigate pathloss on ultra high frequency bands and to increase the reach of radio waves, the following techniques are taken into account for 5G communication systems: beamforming, massive multi-input multi-output (MIMO), full dimensional MIMO (FD-MIMO), array antennas, analog beamforming, and large scale antennas.

Various technologies for enhancing the network of 5G communication systems are also being developed, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for 5G systems including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

LTE dual-connectivity structure means a scheme for user equipment (UE) to use radio resources provided by at least two or more different network nodes (e.g., a master and a secondary eNB or a macro and a small eNB) connected with each other via a non-ideal backhaul in an RRC connected circumstance. Compared with the carrier aggregation scheme in which a transmission delay is taken into slight consideration when a base station connects with, e.g., a remote radio antenna (RRH), the dual-connectivity structure needs to consider, e.g., an inter-base station transmission delay. There is an ongoing discussion regarding the scheme for aggregating radio resources to increase throughput for terminal users. Massive multi-input multi-output (MIMO)-adopted LTE systems give control channels no beamforming gain, thus limiting coverage extension. Massive MIMO refers to a multi-input multi-output technique that uses a few tens of, or more, antennas to transmit massive data at high speed.

The above information is presented as background information only to assist with an understanding of the disclosure. No determination has been made, and no assertion is made, as to whether any of the above might be applicable as prior art with regard to the disclosure.

SUMMARY

According to the embodiments of the disclosure, methods and devices for efficiently controlling beamforming in a wireless communication system are provided.

According to the embodiments of the disclosure, methods and devices for performing beamforming with different time periods allocated to different beam directions in a wireless communication system are provided.

According to the embodiments of the disclosure, methods and devices for adjusting the transmission time proportion for beamforming per beam direction in a wireless communication system are provided.

According to the embodiments of the disclosure, methods and devices for determining the location (distance or beam direction) of a UE in a wireless communication system are provided.

According to the embodiments of the disclosure, methods and device for maintaining a beam direction until an acknowledgment (ACK) signal is received through an uplink channel in a wireless communication system are provided.

According to the embodiments of the disclosure, there is proposed a method and device for maintaining a call in a beam switching system in a wireless communication system.

According to an embodiment of the disclosure, a method for performing beamforming by a base station in a wireless communication system may comprise obtaining transmission time proportions allocated to each of a plurality of beam directions and performing beamforming to send control information in each of the plurality of beam directions based on the obtained transmission time proportions.

Obtaining the transmission time proportions may include obtaining the transmission time proportions based on at least one of a number of active user equipments (UEs) located in each of the plurality of beam directions, the number of in-coverage active UEs, or the number of out-coverage active UEs.

Obtaining the transmission time proportions may include obtaining the transmission time proportions further considering a beam direction related to the out-coverage UEs.

Obtaining the transmission time proportions may include obtaining the transmission time proportions further considering at least one or more of the amount of transmissions required by a UE, spectral efficiency, or resources allocated to a UE.

The method may further comprise receiving a reference signal from a UE, determining the path loss between the base station and the UE based on the received reference signal, and estimating the location of the UE based on the determined path loss.

Estimating the location of the UE may include estimating the distance between the base station and the UE based on the determined path loss or estimating whether the UE is located in coverage or out of coverage by comparing the determined path loss with a threshold.

A beam direction may be maintained until receiving an acknowledgment (ACK) signal from a UE.

A beam direction may be maintained until receiving a predetermined number of retransmission request signals from a UE.

The method may further comprise sending a pilot signal to reset a timer related to declaring a link failure to a UE when the time for transmission in one beam direction as per the obtained transmission time proportions is longer than a link failure declaration time.

The transmission time proportions may be proportions of a time during which a beam radiates in each of the plurality of beam directions.

According to an embodiment, a base station configured to perform beamforming in a wireless communication system may comprise a transceiver configured to perform beamforming communication with a UE and a processor configured to obtain transmission time proportions allocated to each of a plurality of beam directions and control beamforming for sending control information based on the obtained transmission time proportions.

The processor may be configured to obtain the transmission time proportions based on at least one of the number of active user equipments (UEs) located in each of the plurality of beam directions, the number of in-coverage active UEs, or the number of out-coverage active UEs.

The processor may be configured to obtain the transmission time proportions further considering a beam direction related to the out-coverage UEs.

The processor may be configured to obtain the transmission time proportions further considering at least one or more of the amount of transmissions required by a UE, spectral efficiency, or resources allocated to a UE.

The processor may be configured to receive a reference signal from a UE, determine the path loss between the base station and the UE based on the received reference signal, and estimate the location of the UE based on the determined path loss.

The processor may be configured to estimate the distance between the base station and the UE based on the determined path loss or estimate whether the UE is located in coverage or out of coverage by comparing the determined path loss with a threshold.

The processor may be configured to perform a control to maintain a beam direction until it receives an ACK signal from a UE.

The processor may be configured to perform a control to maintain a beam direction until it receives a predetermined number of retransmission request signals from a UE.

The processor may be configured to send a pilot signal to reset a timer related to declaring a link failure to a UE when a time for transmission in one beam direction as per the obtained transmission time proportions is longer than a link failure declaration time.

The transmission time proportions may be proportions of a time during which a beam radiates in each of the plurality of beam directions.

According to an embodiment, a method for receiving a beam by a terminal in a wireless communication system may comprise receiving a beam including control information from a base station and processing the received control information. A time during which the base station transmits the beam to the terminal may be determined based on transmission time proportions allocated to each of a plurality of beam directions.

The transmission time proportions may be determined based on at least one of the number of active user equipments (UEs) located in each of the plurality of beam directions, the number of in-coverage active UEs, or the number of out-coverage active UEs.

The method may further comprise, when the time for sending in one beam direction according to the transmission time proportions is longer than a link failure declaration time, extending the link failure declaration time to be longer than the time for sending in the beam direction.

According to an embodiment, a terminal configured to receive a beam in a wireless communication system comprise a transceiver configured to perform beamforming communication with a base station and a processor configured to process control information received from the base station. A time during which the base station transmits the beam to the terminal may be determined based on transmission time proportions allocated to each of a plurality of beam directions.

The transmission time proportions may be determined based on at least one of the number of active user equipments (UEs) located in each of the plurality of beam directions, the number of in-coverage active UEs, or the number of out-coverage active UEs.

When the time for sending in one beam direction according to the transmission time proportions is longer than a link failure declaration time, the link failure declaration time may be extended to be longer than the time for sending in the beam direction.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
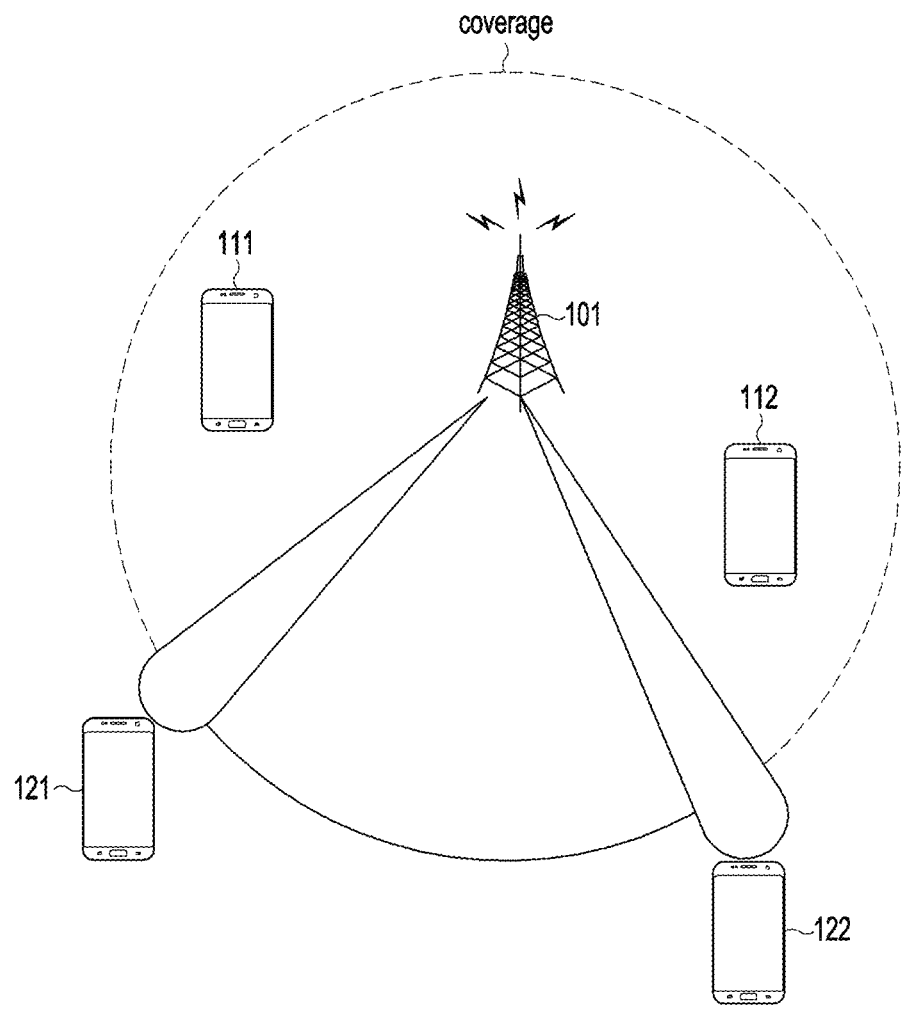
FIG. 1 is a view illustrating an example of beamforming in a multi-user environment.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings. When determined to make the subject matter of the disclosure unclear, the details of the known functions or configurations may be skipped. The terms as used herein are defined considering the functions in the disclosure and may be replaced with other terms according to the intention or practice of the user or operator. Therefore, the terms should be defined based on the overall disclosure.

The terms "first" and "second" as used herein may be used to describe various components, but the components should not be limited by the terms. The terms are used only to distinguish one component from another. It is to be understood that the singular forms "a," "an," and "the" include plural references unless the context clearly dictates otherwise. When an element "includes" another element, the element may further include the other element, rather excluding the other element, unless particularly stated otherwise. As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors.

Accordingly, as an example, a 'unit' includes elements, such as software elements, object-oriented software elements, class elements, and task elements, processes, functions, attributes, procedures, subroutines, data segments of program codes, drivers, firmware, microcodes, circuits, data, databases, data architectures, tables, arrays, and variables. A function provided in an element or a 'unit' may be combined with additional elements or may be split into sub elements or sub units.

Embodiments of the disclosure are described focusing primarily on the relationship in control information communication between the user equipment (UE) and the base station. As used herein, "base station" may mean a network terminal node to directly communicate with a mobile station (or UE). According to the disclosure, a particular operation described to be performed by a base station may be performed by an upper node of the base station in some cases.

For example, in a network constituted of multiple network nodes including the base station, various operations performed to communicate with a mobile station (or UE) may be performed by the base station or other network nodes than the base station. The term "base station" may be interchangeably used with the term "fixed station," "node B," "eNode B (eNB)," "advanced base station (ABS)," or "access point."

The term "mobile station (MS)" may be interchangeably used with the term "user equipment (UE)," "subscriber station (SS)," "mobile subscriber station (MSS)," "mobile terminal," "advanced mobile station (AMS)," or "terminal."

As used herein, "transmit terminal" may refer to a fixed and/or mobile node to provide data or voice service, and "receive terminal" may refer to a fixed and/or mobile node to receive data service or voice service. Accordingly, in the uplink, the UE may be the transmit terminal, and the base station may be the receive terminal. Likewise, in the downlink, the UE may be the receive terminal, and the base station may be the transmit terminal.

As used herein, "UE is located in coverage" or "in-coverage UE" may mean that the UE is located within a range in which it is able to receive signals from the base station even without using beamforming technology in which the base station send out signals in beams, or the UE is located within any coverage range set based on the base station. This phrase may be interchangeably used with "UE is located in inner-coverage."

As used herein, "UE is located out of coverage" or "out-coverage UE" may mean that the UE is located out of a range in which it is able to receive signals from the base station or the UE is located out of any coverage range set based on the base station. Where the UE is located out of coverage but close to the boundary of the coverage, the UE may receive signals from the base station using beamforming technology. The term "out-coverage" may interchangeably be used with "outer-coverage," "coverage hole," or "extended coverage."

The disclosure provides coverage extension technologies for wireless communication systems, e.g., massive MIMO systems or full dimension (FD) MIMO systems.

The disclosure provides technologies for transmitting control information in a different beam direction for each time. Specifically, there is proposed a method for adjusting the time proportion maintained for the same beam direction in transmitting control information in a different beam direction for each time.

The disclosure provides methods for transmitting control information by operating beam switching for coverage extension in a wireless communication system, e.g., a massive MIMO system or FD MIMO system.

The disclosure provides schemes for minimizing loss due to beam switching in operating beam switching for coverage extension.

The disclosure provides methods for efficiently distributing a transmission time per beam direction in operating beam switching for coverage extension.

The disclosure provides call maintaining methods to prevent a call drop from occurring due to a period during which the connected UE receives no signal in operating beam switching for coverage extension. Here, the non-signal receiving period may arise as there occurs a period during which no beam is radiated due to beam switching.

FIG. 1 is a view illustrating an example of beamforming in a multi-user environment.

Referring to FIG. 1, one base station 1 may communicate with at least one UE 111, 112, 121, and 122. To communicate with at least one UE 111, 112, 121, and 122, the base station 101 may have multiple antennas (e.g., a multi-antenna structure). The at least one UE 111, 112, 121, and 122 may also have multiple antennas to communicate with the base station 101. The coverage shown in FIG. 1 may be in a range such that the UE may receive signals from the base station 101 even without using the beamforming technique in which the base station 101 sends signals in beams or a range arbitrarily set based on the base station 101.

When the base station 101 broadcasts control information, the UEs 111 and 112, which are located in the coverage and lack a directivity, may obtain control information sent from the base station 101. However, when the base station 101 broadcasts without a directivity, no beamforming gain may be expected. Thus, the UEs 121 and 122 out of the coverage of the base station 101 might not receive or obtain control information sent from the base station 101. Thus, for the base station 101 to send control information to the out-coverage UEs 121 and 122, it may need to use the beamforming technique in which control information is included in beams and the beams are sent out. According to the disclosure, it is thus provided a beamforming technique for sending out control information and a method for efficiently controlling the beamforming technique.

Figure 2:
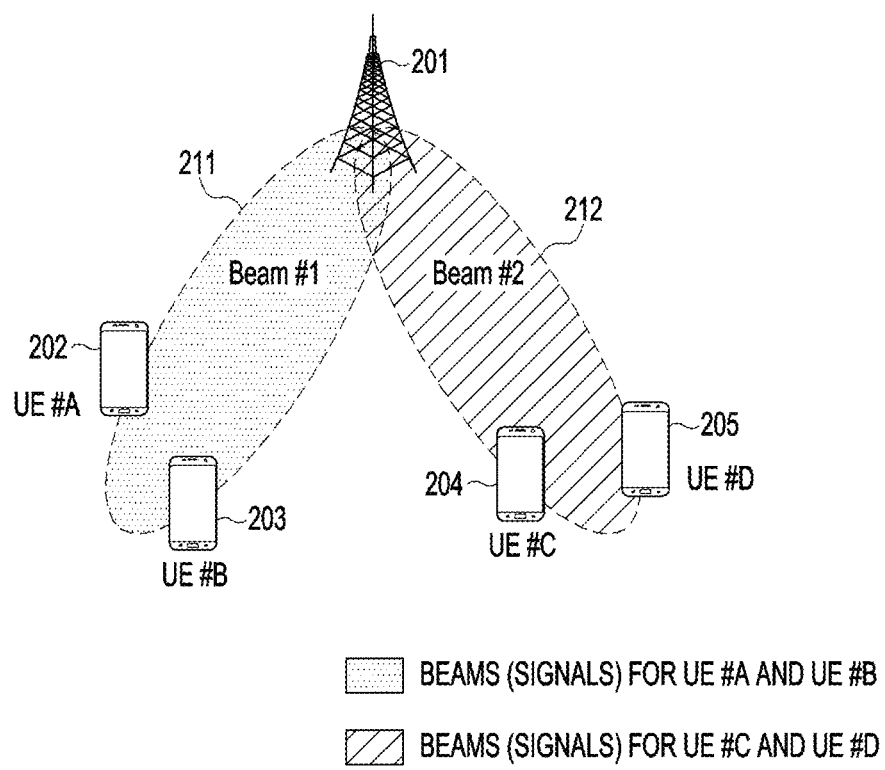
FIG. 2 is a view illustrating an example of beamforming a control channel for a plurality of UEs.

FIG. 2 is a view illustrating an example of beamforming a control channel for a plurality of UEs.

Although FIG. 2 illustrates an example in which one base station 201 performs beamforming on, or beamforming communication with, a plurality of UEs, specifically four UEs 202, 203, 204, and 205, this is merely an example. It is apparent to a skilled artisan that what is described in connection with FIG. 2 may also be applicable to when one base station 201 is connected with more or less than the four UEs. The UEs 202, 203, 204, and 205 of FIG. 2 may be located in, or out of, the coverage of the base station 201, and in either case, what is described with reference to FIG. 2 may apply.

FIG. 2 illustrates an example in which the base station 201 sends or transfers signals to the UEs 202, 203, 204, and 205 using the beamforming technique of transmitting or receiving signals (e.g., data or control information) in beams. Referring to FIG. 2, UE #A 202 and UE #B 203 are located in the beam direction #1 211, and UE #C 204 and UE #D 205 are located in a beam direction #2 212. Since a beamformed beam has directivity, UEs departing from the direction or the span (or area) of the beam may not receive or obtain the signal (e.g., data or control information) contained in the emitted beam. Referring to FIG. 2, when the base station 201 emits a beam in the beam direction #1 211 in order to send a signal (e.g., data or control information) to UE #A 202 and UE #B 203, the beam does not reach UE #C 204 and UE #D 205, which are located in the other beam direction. Accordingly, when the base station 201 performs beamforming to send control information A and B to UE #A 202 and UE #B 203, UE #C 204 and UE #D 205 located in the other beam direction #2 212 may not receive or obtain the control information A and B contained in the beam oriented to UE #A 202 and UE #B 203.

Figure 3:
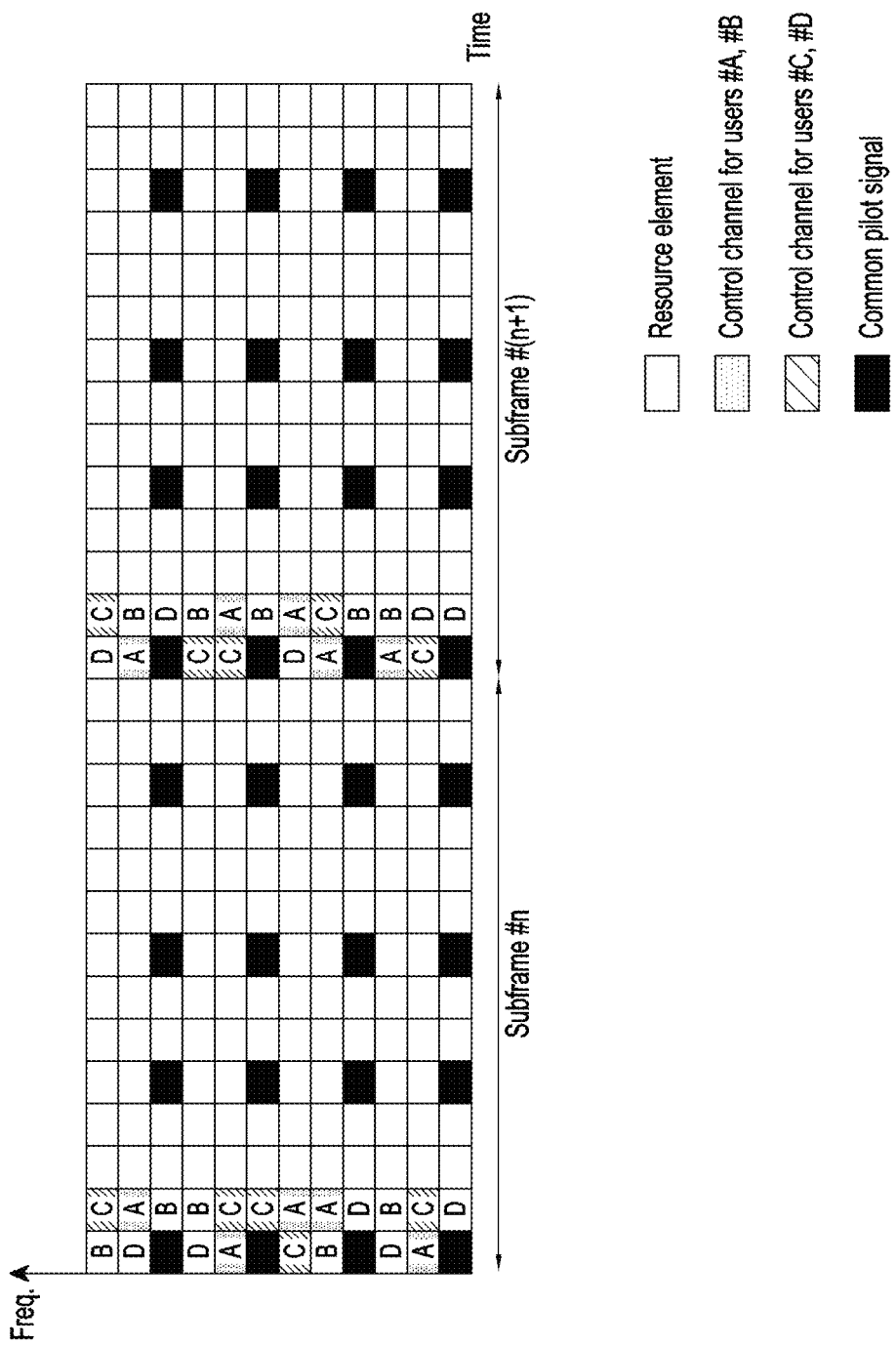
FIG. 3 is a view illustrating an example of allocating the same time period to a plurality of UEs.

FIG. 3 is a view illustrating an example of allocating the same time period to a plurality of UEs.

FIG. 3, as associated with FIG. 2, illustrates an example of a configuration in which control information A, B, C, and D and a common pilot signal are allocated for UE #A 202, UE #B 203, UE #C 204, and UE #D 205.

In FIG. 3, the horizontal axis refers to the time domain, and the vertical axis refers to the frequency domain. Each square in FIG. 3 refers to a resource element (RE). For example, each square in the horizontal axis may be said to be a transmission time interval (TTI), or orthogonal frequency division multiplexing (OFDM) symbol. For example, each square in the vertical axis may be said to be a subcarrier.

FIG. 3 illustrates an example in which one subframe (e.g., subframe #n or subframe #(n+1)) contains all the resources to which the respective pieces of control information A, B, C, and D for UE #A 202, UE #B 203, UE #C 204, and UE #D 205 are mapped. For example, when beamforming is performed in beam direction #1 211, with the resources allocated as shown in FIG. 3, control information A and B for UE #A 202 and UE #B 203 may be sent (or transferred) to UE #A 202 and UE #B 203, but the control information C and D for UE #C 204 and UE #D 205 may not be sent (or transferred) to UE #C 204 and UE #D 205. In this case, although UE #C 204 and UE #D 205 may fail to receive the beams from the base station 201 due to the directivity of the beam, the control information C and D regarding UE #C 204 and UE #D 205 may be taken as having been allocated to be sent to UE #A 202 and UE #B 203. As the resources mapped with the control information C and D regarding UE #C 204 and UE #D 205 are allocated, resource waste may arise.

As another example, when beamforming is performed in beam direction #2 212, with the resources allocated as shown in FIG. 3, the control information C and D for UE #C 204 and UE #D 205 may be sent (or transferred) to UE #C 204 and UE #D 205, but the control information A and B for UE #A 202 and UE #B 203 may not be sent (or transferred) to UE #A 202 and UE #B 203. In this case, as the control information A and D regarding UE #A 202 and UE #B 203 is allocated, resource waste may arise.

Thus, a need exists for preventing resource waste (consumption) that occurs as control information-mapped resources are allocated to UEs even though the UEs cannot receive beams from the base station due to their location related to the beam direction.

An embodiment of beamforming differing per time period to send out control information is described below with reference to FIGS. 4, 5, and 6.

Figure 4:
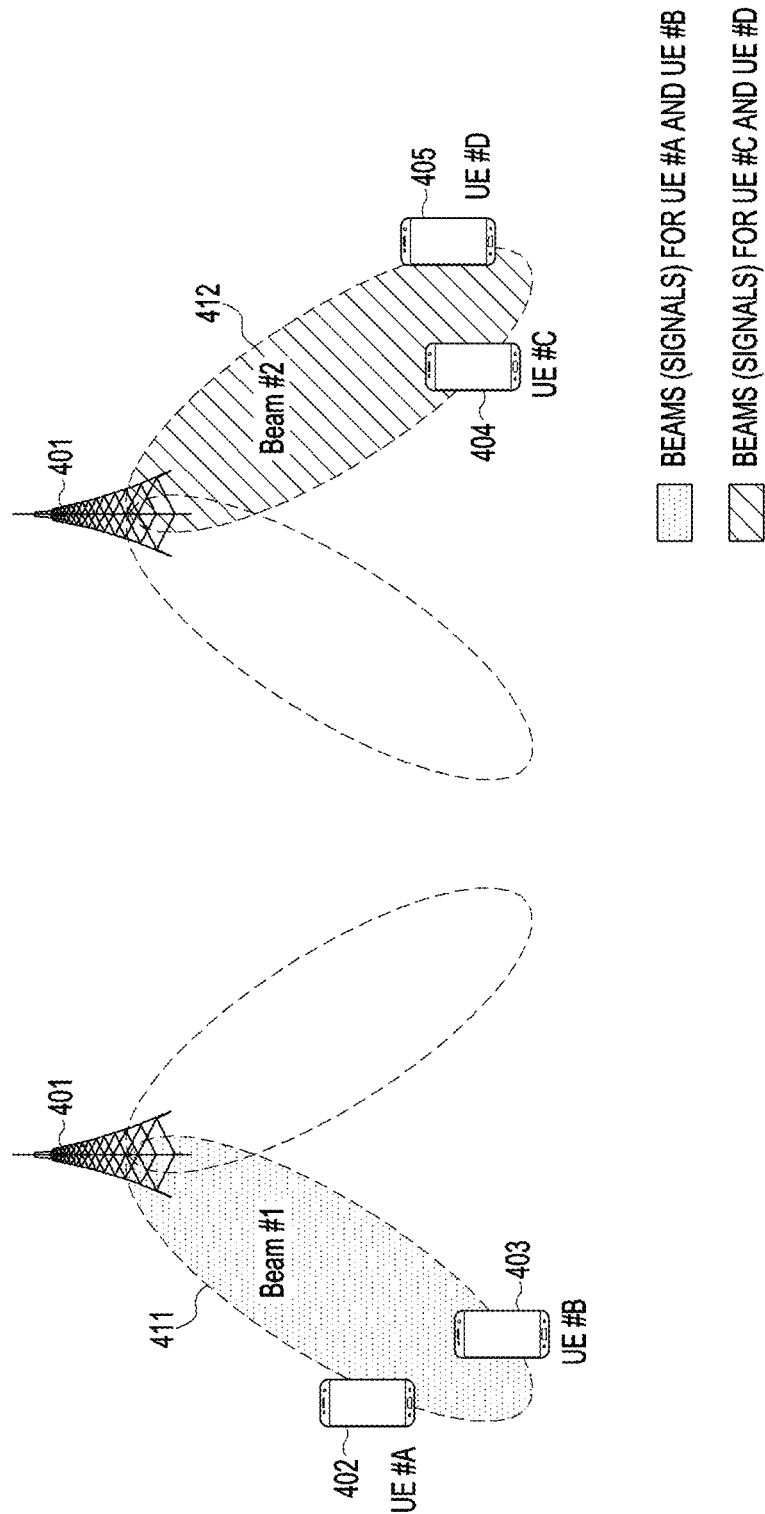
FIG. 4 is a view illustrating an example of sequentially beamforming in different beam directions according to an embodiment.

FIG. 4 is a view illustrating an example of sequentially beamforming in different beam directions according to an embodiment.

Control channels, such as a physical downlink control channel (PDCCH) or a physical hybrid ARQ indicator channel (PHICH), have their constituent resources distributed over the entire frequency region, and they adopt a common pilot signal or reference signal (RS) for channel estimation. Thus, the control channels are difficult to simultaneously send out to the UEs located in multiple beam directions (e.g., different beam directions), and a difficulty exists in coverage extension for the control channels.

To address this issue, according to an embodiment as shown in FIG. 4, it is provided a method for performing beamforming in a beam direction for each time period (e.g., a subframe or TTI) to send out control information to UEs located in different beam directions. Specifically, according to the embodiment of FIG. 4, a method is provided for radiating beams to UEs located in different beam directions in subframe units, with the beams separated in the time domain. This embodiment may also apply when beams are radiated to UEs located in different beam directions in slot or OFDM symbol units. Meanwhile, according to the instant embodiment, it is possible to obtain a beamforming (BF) gain for a control channel and to extend coverage for a control channel.

FIG. 4 illustrates an example of one base station 401 performing beamforming on a plurality of UEs 402, 403, 404, and 405. Although four UEs 402, 403, 404, and 405 are shown in FIG. 4, this is merely an example. It is apparent to a skilled artisan that what is described in connection with FIG. 4 may also be applicable to when one base station 401 is connected with more or less than the four UEs. Although FIG. 4 illustrates an example in which two UEs 402 and 403 or 404 and 405 are located in one beam direction 411 or 412, this is merely an example for illustration purposes, and it is apparent that one or three or more UEs may be located or belong in one beam direction 411 or 412. The UEs 202, 203, 204, and 205 of FIG. 2 may be located in, or out of, the coverage of the base station 201, and in either case, what is described with reference to FIG. 2 may apply.

Referring to FIG. 4, the base station 401 may perform beamforming to send control information A and B regarding UE #A 402 and UE #B 403, which are located in beam direction #1 411, to UE #A 402 and UE #B 403 in transmission time #1. The base station 501 may perform beamforming to send control information C and D regarding UE #C 504 and UE #D 505, which are located in beam direction #2 412, to UE #C 504 and UE #D 505 in transmission time #2 (e.g., a time different from transmission time #1). For example, the base station 401 may perform beamforming to send control information regarding UEs, which are located in different beam directions, to the UEs, per time period. Here, transmission time #1 and transmission time #2 may be time periods (units) differentiated by subframes, slots, or OFDM symbols.

According to the disclosure, a method is provided for obtaining a beamforming gain by sending control information, common pilot signal, or other signals in separate beams in the time domain using such a method.

Figure 5:
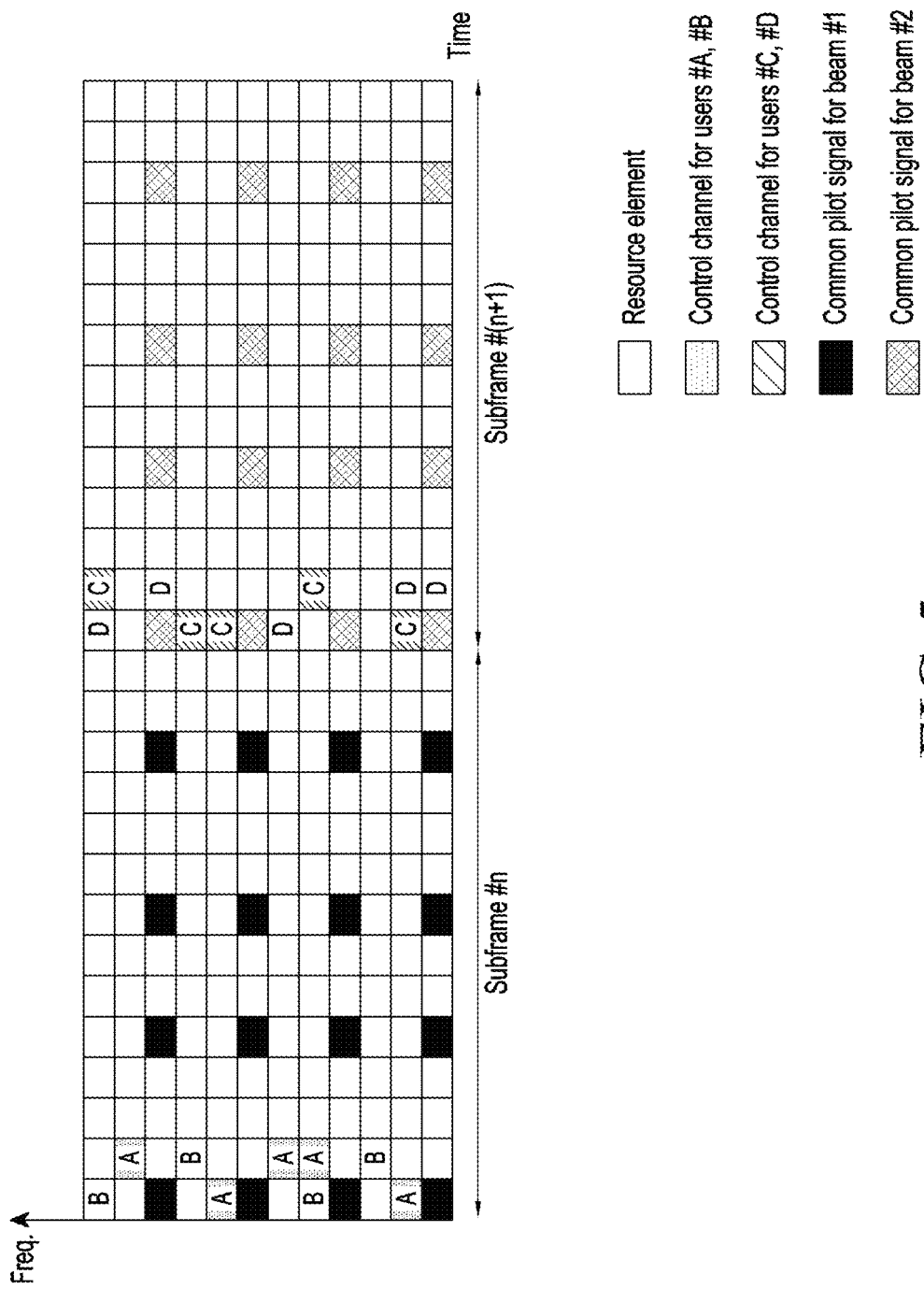
FIG. 5 is a view illustrating an example of allocating resources to UEs located in different beam directions according to an embodiment.

FIG. 5 is a view illustrating an example of allocating resources to UEs located in different beam directions according to an embodiment of the present disclosure.

Referring to FIGS. 4 and 5, for example, resources for sending control information A and B and a pilot signal for UE #A 402 and UE #B 403 located in beam direction #1 411 are allocated in a subframe #n period (transmit time #1), and resources for control information C and D and a pilot signal for UE #C 404 and UE #D 405 located in beam direction #2 412 are allocated in a subframe #n+1 period (transmission time #2).

For example, the base station 401 may perform beamforming only to send control information A and B regarding UE #A 402 and UE #B 403, which are located in the beam direction #1 411, to UE #A 402 and UE #B 403 in the subframe #n period (transmission time #1). The base station 401 may perform beamforming only to send control information C and D regarding UE #C 404 and UE #D 405, which are located in the beam direction #2 412, to UE #C 404 and UE #D 405 in the subframe #n+1 period (transmission time #2).

As such, as the resources mapped with the control information C and D regarding UE #C 404 and UE #D 405 are not allocated in the subframe #n period (transmission time #1) during which the base station 401 radiates beams in beam direction #1 411 when only UE #A 402 and UE #B 403 may receive beams, such resource waste (consumption), which may be caused by allocating the resources mapped with the control information C and D regarding UE #C 404 and UE #D 405 in the subframe #n period (transmission time #1), may be prevented.

According to an embodiment, the base station may allocate resources in a different time period per beam direction, not only for the control information regarding the UEs located in each beam direction but also for the common pilot signals.

Referring to FIGS. 4 and 5, the base station 401 may allocate resources mapped with a common pilot signal differing per time period. Here, the common pilot signal may be a pilot signal (or reference signal) for decoding each beam regarding a different beam direction.

Alternatively, the base station 401 may allocate resources regarding the same common pilot signal regardless of time periods.

Such a control channel beamforming method may be useful when the downlink (DL) common channel has limited coverage, such as when downlink transmit power is small in, e.g., a 3.5 GHz citizens broadband radio service (CBRS) band fixed wireless access (FWA) environment or a small-cell environment, or when TDD DL has less coverage than FDD UL in time division duplex-frequency division duplex carrier aggregation (TDD-FDD) CA. For example, the methods described herein may be available for, e.g., FWA, small-cell, or TDD-FDD CA.

Figure 6:
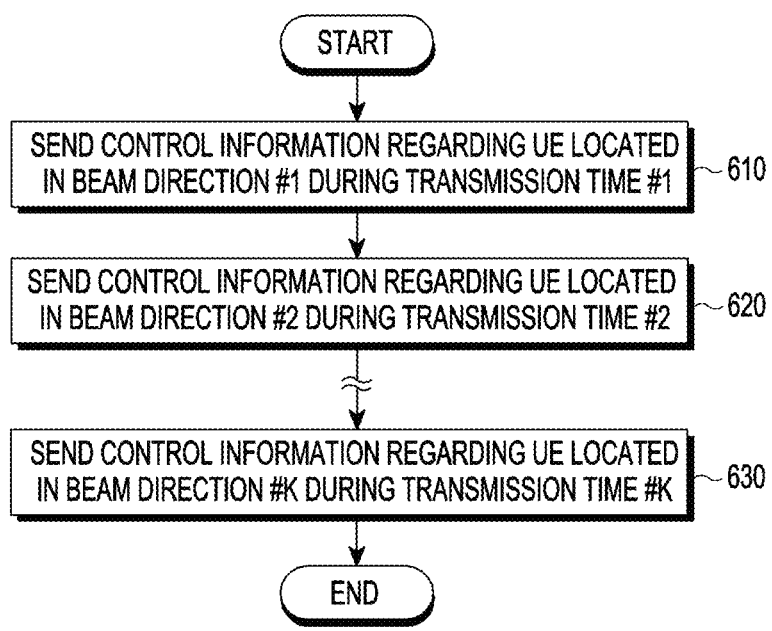
FIG. 6 is a view illustrating an exemplary method for sequentially beamforming in different beam directions according to an embodiment.

FIG. 6 is a view illustrating a method for sequentially beamforming in different beam directions according to an embodiment.

Referring to FIG. 6, a base station may sequentially send control information regarding a UE located in beam direction #1 to the UE in the transmission time #1 (610), control information regarding another UE located in the beam direction #2 to the other UE in the transmission time #2 (620), and control information regarding a next UE located in the beam direction #K to the next UE in the transmission time #K (630).

For example, the beam direction #1 through the beam direction #K may be eight beam directions divided from the 360-degree directions with respect to the beamforming base station. In this case, K may be 8, and the beam direction #1 through beam direction #K may be differentiated with the same or different angles. As another example, the base station may sequentially perform beamforming in the eight beam directions for 400 ms and may perform beamforming, i.e., radiate beams, in each beam direction for 50 ms.

Figure 7:
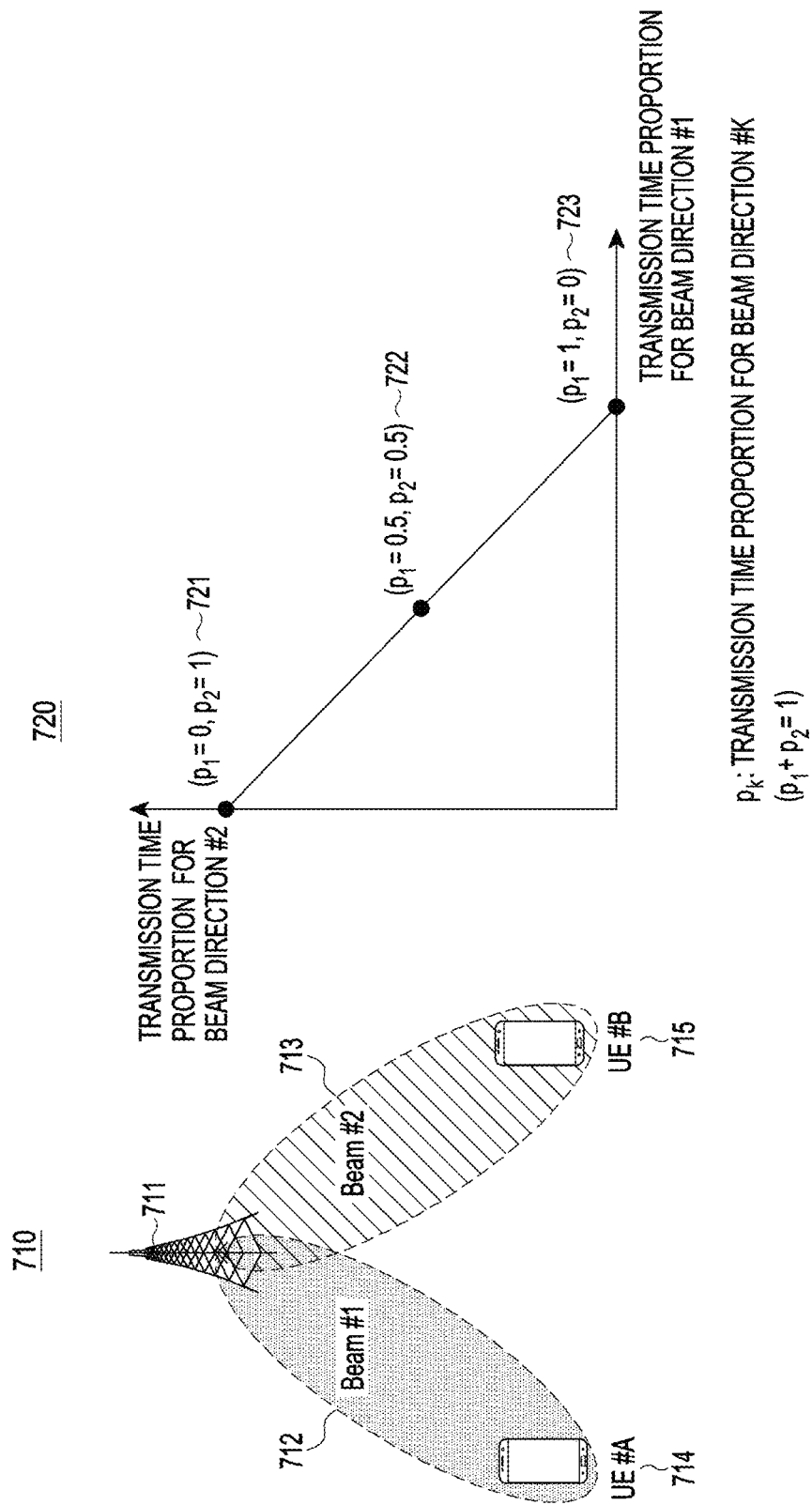
FIG. 7 is a view illustrating an example of a beamforming time proportion for each beam direction.

FIG. 7 is a view illustrating an example of a beamforming time proportion for each beam direction.

When a beamforming transmission time period is determined (selected) in an arbitrary proportion for each of a plurality of beam directions 712 and 713, fairness between UEs 714 and 715 is determined as per the apportionment of beamforming transmission time. Accordingly, when the beamforming transmission time or beam switching time operates in a fixed (arbitrary) proportion without considering the resources of each of UEs 714 and 715, inefficient resource allocation results.

FIG. 7 is a graph illustrating a beamforming transmission time proportions when there are two beam directions.

Referring to the graph 720 of FIG. 7, 721 indicates an example in which the base station 711 radiates beams only in the beam direction #2. 722 indicates an example in which the base station 711 evenly apportions the time periods during which beams are radiated in the beam direction #1 and the beam direction #2, namely, the time during which the base station 711 radiates beams in the beam direction #1 is the same as the time during which the base station 711 radiates beams in the beam direction #2. 723 may indicate an example in which the base station 711 radiates beams only in the beam direction #1. Referring to FIG. 7, the sum of the transmission time proportions ($\rho_k$) apportioned between the beam directions is 1.

Figure 8:
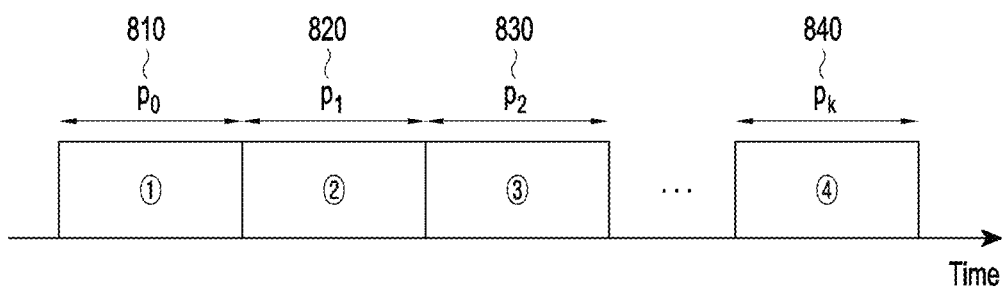
FIG. 8 is a view illustrating an example of adjusting a beam transmission time proportion according to an embodiment.

FIG. 8 is a view illustrating an example of adjusting a beam transmission time proportion according to an embodiment.

FIG. 8 illustrates the respective proportions of a time period 810 during which beams are sent to in-coverage UEs and beams are sent to out-coverage UEs in a plurality of beam directions (e.g., the beam direction #1 through the beam direction #K). The base station may send signals to the in-coverage UEs by using a communication means other than beamforming, and when the in-coverage UEs are located in the same beam direction, the base station may send signals via beamforming. What is described in connection with FIG. 8 may be applicable when there is no in-coverage UE.

In FIG. 8, the sum of the transmission time proportions $\rho_k$ is 1.

According to an embodiment, the base station may apportion the transmission time or determine transmission time proportions in proportion to the number of in-coverage UEs and out-coverage UEs in each beam direction (e.g., active UEs).

According to an embodiment, provided below are the Equation 1 for obtaining transmission time proportions $\rho_k$ in proportion to the number of UEs located in each beam direction (e.g., active UEs), the Equation 2 for obtaining transmission time proportions in proportion to the totality of data required to be transmitted (buffer occupancy (BO)) by UEs, the Equation 3 for obtaining transmission time proportions given the amount of data required to be transmitted (BO) by UEs and the spectral efficiency of each UE, and the Equation 4 for obtaining transmission time proportions in proportion to resources allocated to UEs.

The base station may obtain (or calculate or determine) the time proportions $\rho_k$ using at least one or more of the Equations 1 to 4 described below. It may not only be a controller or process inside the base station, but also another network entity that obtains the time proportions. For ease of description, it is hypothesized that the base station uses the Equations 1 to 4.

For example, the base station may obtain (or calculate or determine) the time proportions using the Equation 1 below. For example, the base station may obtain time proportions in proportion to the number of UEs requiring data transmission belonging to each beam direction.

$$\rho_k^* = \frac{N_k}{\sum_{m=0}^{K} N_m} (0 \le k \le K) \quad \text{[Equation 1]}$$

where $\rho_0$: an in-coverage data transmission time proportion, $\rho_k (1 \le k \le K)$: an out-coverage transmission time proportion, K: the number of beam directions in an out-coverage area, $N_0$: the number of in-coverage UEs, and $N_k (1 \le k \le K)$: the number of out-coverage UEs located in the beam direction #K.

As another example, the base station may obtain (or calculate or determine) the time proportions using the Equation 2 below. For example, the base station may obtain time proportions in proportion to the totality of buffer occupancy (BO) of UEs. Here, the UEs may be located in the same beam direction.

$$\rho_k^* = \frac{\sum_{i=0}^{L_k-1} BO_k(i)}{\sum_{m=0}^{K} \sum_{i=0}^{L_m-1} BO_m(i)} (0 \le k \le K) \quad \text{[Equation 2]}$$

where $BO_0(i)$ the number of bits required to be transmitted by in-coverage UE #i $BO_k(i)(1 \le k \le K)$: the number of bits required to be transmitted by out-coverage UE #i located in the beam direction #K.

As yet another example, the base station may obtain (or calculate or determine) the time proportions using the Equation 3 below. The base station may obtain time proportions considering the amount (BO) required to be transmitted by UEs and the spectral efficiency (e.g., modulation coding scheme (MCS)) of each UE. For example, high-MCS UEs may require fewer resources even though their BO is high, and low-MCS UEs may require more resources even though their BO is low.

$$\rho_k^* = \frac{\sum_{i=0}^{L_k-1} BO_k(i)/SE_k(i)}{\sum_{m=0}^{K} \sum_{i=0}^{L_m-1} BO_m(i)/SE_m(i)} (0 \le k \le K) \qquad \text{[Equation 3]}$$

where $SE_0(i)$: the number of bits transmittable per unit resource of in-coverage UE #i, and $SE_k(i)(1 \le k \le K)$:

the number of bits transmittable per unit resource of out-coverage UE #i located in beam direction #K.

As yet another example, the base station may obtain (or calculate or determine) the time proportions using the Equation 4 below. In other words, the base station may obtain time proportions in proportion to resources (physical resource blocks (PRBs)) allocated to UEs.

$$\rho_k^* = \frac{PRB_k}{\sum_{m=0}^{K} PRB_m} (0 \le k \le K) \qquad \text{[Equation 4]}$$

where $PRB_0(i)$: the resources allocated to an in-coverage area, and $PRB_k(i)(1 \le k \le K)$:

the resources allocated to an out-coverage area in the beam direction #K.

Figure 9:
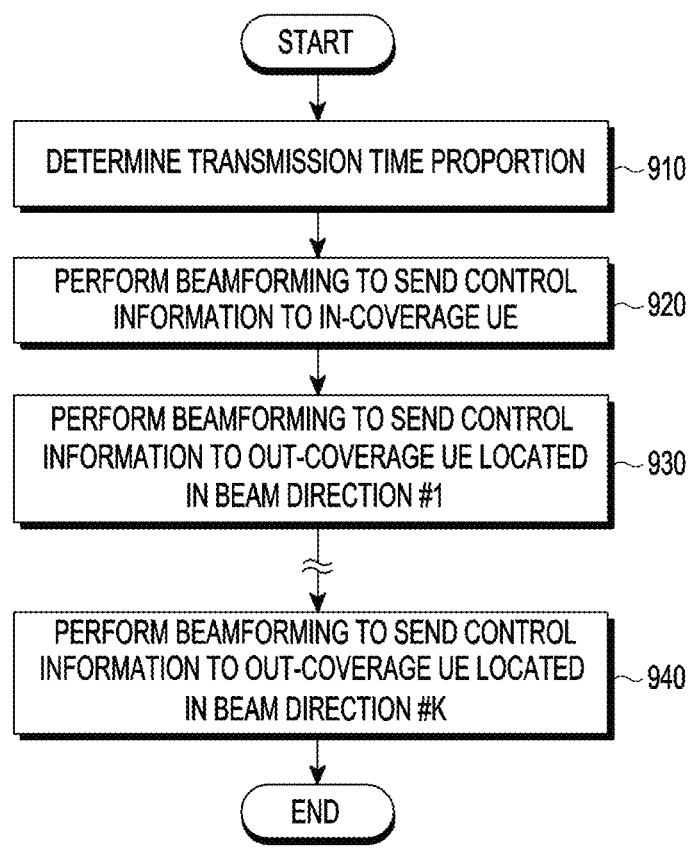
FIG. 9 is a flowchart illustrating an exemplary method for performing beamforming on each beam direction based on a beam transmission time proportion determined, according to an embodiment.

FIG. 9 is a flowchart illustrating an exemplary method for performing beamforming on each beam direction based on a beam transmission time proportion determined, according to an embodiment of the present disclosure.

Referring to FIG. 9, a base station obtains (or calculates or determines) a transmission time proportion for each beam direction using a predetermined method (910). The predetermined method may be a method using at least one or more of the Equations 1 to 4 above. It may not only be a controller or process inside the base station, but also another network entity that obtains the time proportions.

The base station performs beamforming to send control information to in-coverage UEs based on the determined transmission time proportions (920). Performing beamforming to send control information may refer to technology for radiating beams to enable the control information to be carried on the beams. Alternatively, sending control information to the in-coverage UEs may be omitted when there is no in-coverage UE, and in some case, may be performed after control information beamforming is performed (completed) on out-coverage UEs.

The base station performs beamforming to send control information to out-coverage UEs located in the beam direction #1 based on the determined transmission time proportions (930). The base station performs beamforming to send control information to out-coverage UEs located in the beam direction #2 to the beam direction #K based on the determined transmission time proportions (940). The base station may perform beamforming in the beam direction #1 to the beam direction #K sequentially, selectively, optionally, or in any order. The base station may perform beamforming to send control information to the in-coverage area once and to the out-coverage area once.

A method for determining whether UEs to perform beamforming transmission/reception with a base station are located in or out of coverage and a method for estimating (identifying) the direction of the UEs are described with reference to FIGS. 12 and 13.

Figure 10:
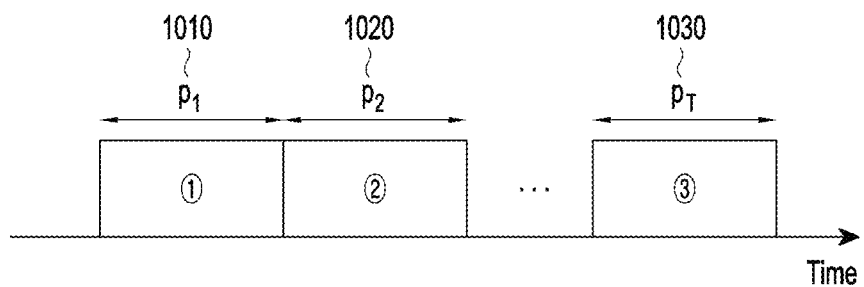
FIG. 10 is a view illustrating an example of adjusting a beam transmission time proportion according to another embodiment.

FIG. 10 is a view illustrating an example of adjusting a beam transmission time proportion according to another embodiment.

FIG. 10 illustrates the proportions of time periods 1010, 1020, and 1030 during which beams are transparently displayed in a plurality of beam directions (e.g., beam direction #1 to beam direction #K). Unlike in the embodiments described with FIGS. 8 and 9, as per the embodiment of FIG. 10, there is proposed an example of determining transmission time proportions considering beam directions alone, but not whether UEs are located in or out of coverage.

In FIG. 10, the sum of the transmission time proportions $\rho_t$ is 1.

According to an embodiment, the base station may apportion the transmission time or determine transmission time proportions in proportion to the number of UEs in each beam direction (e.g., active UEs).

According to an embodiment, provided below are the Equation 5 for obtaining transmission time proportions $\rho_t$ in proportion to the number of UEs located in each beam direction (e.g., active UEs), the Equation 6 for obtaining transmission time proportions in proportion to the totality of data required to be transmitted (buffer occupancy (BO)) by UEs, the Equation 7 for obtaining transmission time proportions given the amount of data required to be transmitted (BO) by UEs and the spectral efficiency of each UE, and Equation 8 for obtaining transmission time proportions in proportion to resources allocated to UEs.

The base station may obtain (or calculate or determine) the time proportions $\rho_t$ using at least one or more of the Equations 5 to 8 described below. It may not only be a controller or process inside the base station, but also another network entity that obtains the time proportions. For ease of description, it is hypothesized that the base station uses the Equations 5 to 8.

For example, the base station may obtain (or calculate or determine) the time proportions using the Equation 5 below. For example, the base station may obtain time proportions in proportion to the number of UEs requiring data transmission belonging to each beam direction.

$$\rho_t^* = \frac{N_t}{\sum_{m=1}^{T} N_m} (1 \le t \le T) \qquad \text{[Equation 5]}$$

where $\rho_t (1 \leq t \leq T)$:

the transmission time proportion for beam direction #t,
T: number of beam directions, and $N_t (1 \leq t \leq T)$:

the number of UEs located in beam direction #t.

As yet another example, the base station may obtain (or calculate or determine) the time proportions using Equation 6 below. For example, the base station may obtain time proportions in proportion to the totality of buffer occupancy (BO) of UEs. Here, the UEs may be located in the same beam direction.

$$\rho_t^* = \frac{\sum_{i=1}^{L_t-1} BO_t(i)}{\sum_{m=1}^{T} \sum_{i=1}^{L_m-1} BO_m(i)} (1 \leq t \leq T) \quad \text{[Equation 6]}$$

where $BO_t(i)(1 \leq t \leq T)$:

the number of bits required to be transmitted by UE #i located in a beam direction #t.

As yet another example, the base station may obtain (or calculate or determine) the time proportions using Equation 7 below. For example, the base station may obtain time proportions considering the amount (BO) required to be transmitted by UEs and the spectral efficiency (e.g., MCS) of each UE. For example, high-MCS UEs may require fewer resources even though their BO is high, and low-MCS UEs may require more resources even though their BO is low.

$$\rho_t^* = \frac{\sum_{i=1}^{L_t-1} BO_t(i)/SE_t(i)}{\sum_{m=1}^{T} \sum_{i=1}^{L_m-1} BO_m(i)/SE_m(i)} (1 \leq t \leq T) \quad \text{[Equation 7]}$$

where $SE_t(i)(1 \leq t \leq T)$:

the number of bits transmittable per unit resource of UE #i located in beam direction #t.

As yet another example, the base station may obtain (or calculate or determine) the time proportions using Equation 7 below. In other words, the base station may obtain time proportions in proportion to resources (physical resource blocks (PRBs)) allocated to UEs.

$$\rho_t^* = \frac{PRB_t}{\sum_{m=1}^{T} PRB_m} (1 \leq t \leq T) \quad \text{[Equation 8]}$$

where $PRB_t(i)(1 \leq t \leq T)$:

resources allocated to an area in beam direction #t.

Figure 11:
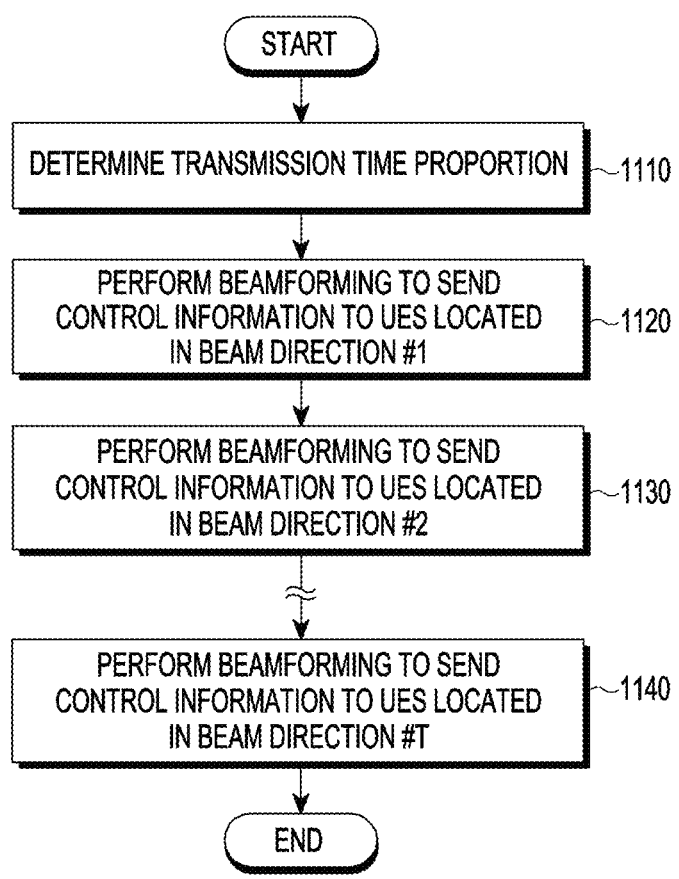
FIG. 11 is a flowchart illustrating an exemplary method for performing beamforming on each beam direction based on a beam transmission time proportion determined, according to another embodiment.

FIG. 11 is a flowchart illustrating a method for performing beamforming on each beam direction based on a beam transmission time proportion determined, according to another embodiment.

Referring to FIG. 11, a base station obtains (or calculates or determines) a transmission time proportion for each beam direction using a predetermined method (1110). The predetermined method may be a method using at least one or more of Equations 5 to 8 above. It may not only be a controller or process inside the base station, but also another network entity that obtains the time proportions.

The base station performs beamforming to send control information to UEs located in beam direction #1 to beam direction #T based on the determined transmission time proportions (1120 to 1140). Performing beamforming to send control information may refer to technology for including the control information in beams and radiating the beams. The base station may perform beamforming in beam direction #1 to beam direction #T sequentially, selectively, optionally, or in any order. The base station may perform beamforming to send control information to the in-coverage area once and to the out-coverage area once.

Figure 12:
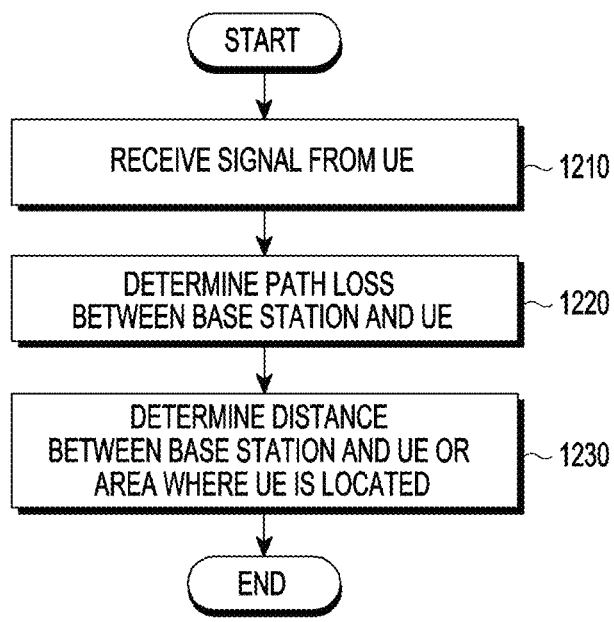
FIG. 12 is a flowchart illustrating an exemplary method for determining the location of a UE according to an embodiment.

FIG. 12 is a flowchart illustrating a method for determining the location of a UE according to an embodiment.

Described with reference to FIG. 12 is a method for differentiating between in-coverage UEs and out-coverage UEs. There is specifically proposed a method for using the transmit and receive the power of signals, e.g., uplink sounding reference signal (UL SRS), transmitted from a UE to determine (estimate) the (in-coverage or out-coverage) area when the UE is located and the distance between the UE and the base station. Here, SRS refers to a reference signal that the UE sends to allow the base station to identify the channel.

According to an embodiment, the base station may obtain (or calculate or determine) a path loss based on the transmit power, in which the UE sends a signal, and the receive power, in which the base station receives the signal, and by using Equation 9 below.

Path loss [dB]=UE transmit power [dB]−base station receive power [dB]    [Equation 9]

Referring to Equation 9, it may be shown that as the path loss increases, the distance between the UE and the base station increases.

The base station may determine whether the UE is located in coverage or out of coverage by comparing a predetermined threshold with the path loss obtained using Equation 9 (or other means). The predetermined threshold may be a value representing the boundary of the coverage area. For example, when the obtained path loss is larger than the predetermined threshold, the base station may determine that the UE is located out of coverage, and, when smaller, may determine that the UE is located in coverage.

The base station may obtain the path loss of each of a plurality of UEs and compare the obtained path losses, thereby estimating (relative) distances between the base station and the UEs.

According to an embodiment, the base station may obtain (or calculate or determine) a path loss based on an (estimated) SRS transmit power and an (estimated) SRS receive power and using Equation 10 below.

$$PL\_SRS \text{ [dB]} = SRS \text{ transmit power [dB]} - SRS \text{ receive power [dB]} \quad \text{[Equation 10]}$$

The base station may estimate the SRS transmit power using a power headroom report (PHR) or SRS offset. Here, the PHR indicates how much transmit power remains in the UE. The SRS offset may be a calibration term to offset power for each UE.

The base station may determine whether the UE is located in coverage or out of coverage by comparing a predetermined threshold with the path loss (PL_SRS) obtained using Equation 10 (or other means). The predetermined threshold may be a value representing the boundary of the coverage area. For example, when the obtained path loss is larger than the predetermined threshold, the base station may determine that the UE is located out of coverage, and, when smaller, may determine that the UE is located in coverage.

Figure 13:
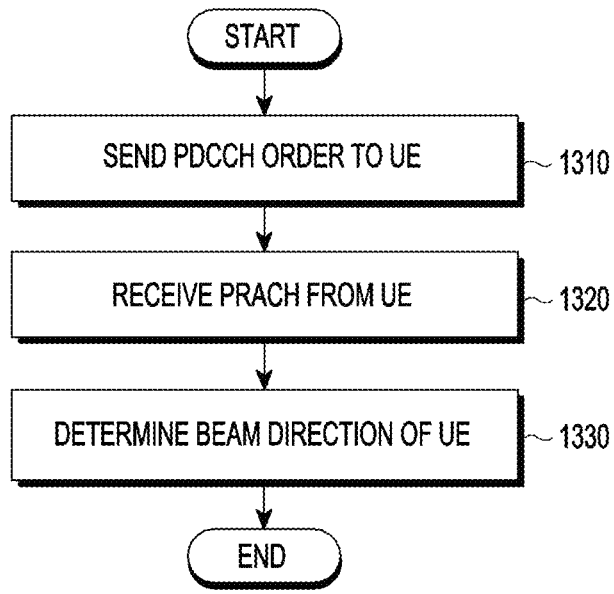
FIG. 13 is a flowchart illustrating an exemplary method for a base station to determine the beam direction in which a UE is located according to an embodiment.

FIG. 13 is a flowchart illustrating a method for a base station to determine the beam direction in which a UE is located according to an embodiment.

Described with reference to FIG. 13 is a method for determining beam directions using PDCCH order or physical random access channel (PRACH).

Referring to FIG. 13, the base station sends a PDCCH order to the UE (1310). Here, PDCCH order may be a mechanism by which the base station forces the UE to initiate PRACH and refer to a signal transmitted through the PDCCH.

The base station receives the PRACH signal from the UE (1320). For example, receiving the PDCCH order, the UE may continuously send the PRACH signal to the base station. Upon receiving the PDCCH order signal, the UE may send the PRACH t the base station even when a call connection is established. For reference, the random access channel (RACH) is used for the UE to synchronize with the network to establish an initial connection pipe.

The base station may receive the PRACH signal from the UE and multiply the received PRACH signal by several beam weights. The base station may identify (determine) which one of the beam weights multiplied by the received PRACH results in the maximum receive signal noise ratio (SNR) (or S/R) value. Here, each of the beam weights may correspond to a respective one of the beam directions.

The base station determines (estimates) that the UE that sent the PRACH is located in the beam direction corresponding to the beam weight which is multiplied by the received PRACH to result in the maximum SNR value (1330).

The base station may perform beamforming in the determined (estimated) beam direction based on the result of the determination (estimation). That is, the base station may radiate beams.

The base station may determine (estimate) the location (i.e., beam direction) of the UE by obtaining the weight resulting in the maximum SNR value in such a manner as to multiply the received signal by the number of weights. For example, the base station may determine (estimate) k in Equations 1 to 4 or t in Equations 5 to 8.

Figure 14:
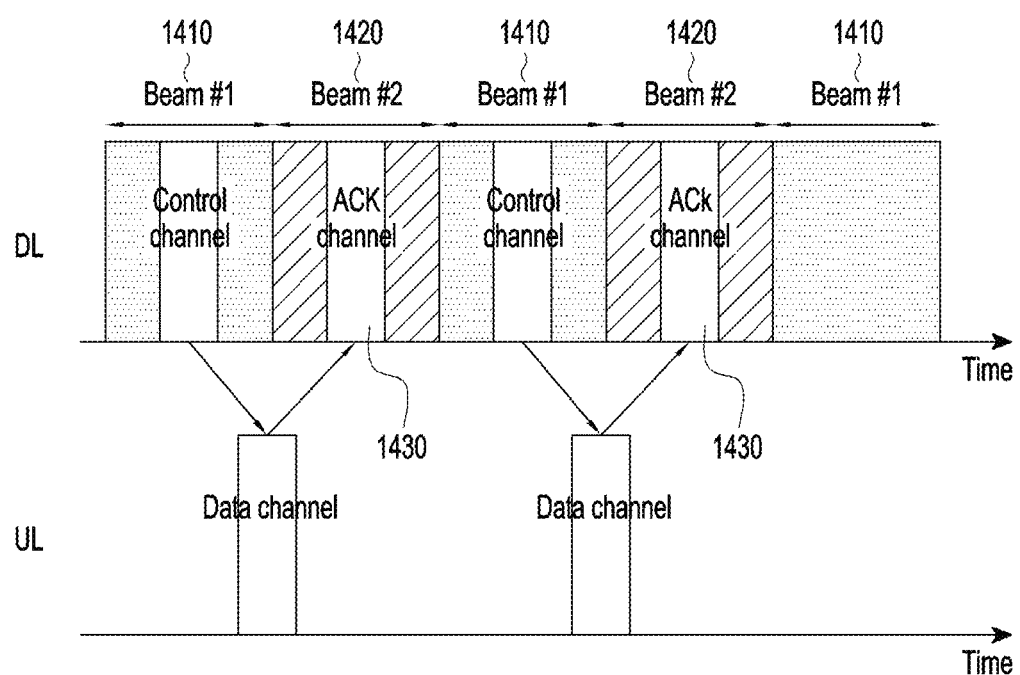
FIG. 14 is a view illustrating an example of receiving a response signal corresponding to a control channel.

FIG. 14 is a view illustrating an example of receiving a response signal corresponding to a control channel.

FIG. 14 illustrates an example in which no acknowledgment (ACK) signal is received due to beam switching. Here, beam switching may refer to changing the direction of beams radiated from the base station.

FIG. 14 illustrates an example in which transmission time periods 1410 during which beamforming is performed beam direction #1 and transmission time periods 1420 during which beamforming is performed in beam direction #2 are alternately allocated. For example, as the base station performs beam switching (1420) to beam direction #2 during the time when it is required to receive an acknowledgment (ACK) signal (1430) from the UE located in beam direction #1 as shown in FIG. 14, the base station may fail to receive the ACK signal 1430.

For example, the base station may send control information to the UE located in beam direction #1, and in response to the control information received, the UE located in beam direction #1 may send the ACK signal 1430 to the base station. However, since the base station has already switched the beam direction to beam direction #2 before the ACK signal sent from the UE located in beam direction #1 reaches the base station, the base station may fail to receive the ACK signal from the UE. That is, when beams are radiated to the UEs located in different beam directions per time period as described above in connection with FIGS. 4 to 6, resource loss may occur at the beam direction boundary.

In other words, when DL/UL channels are allocated to UEs located in different beam directions during similar times, e.g., when an ACK channel transmission period 1410 for the uplink data channel of the UE located beam direction #K belongs to the transmission period 1420 for the UE located in beam direction #(k+1), transmission is rendered impossible due to differing beam directions.

A relevant method for maintaining a beam direction during a predetermined time is described with reference to FIG. 15.

Figure 15:
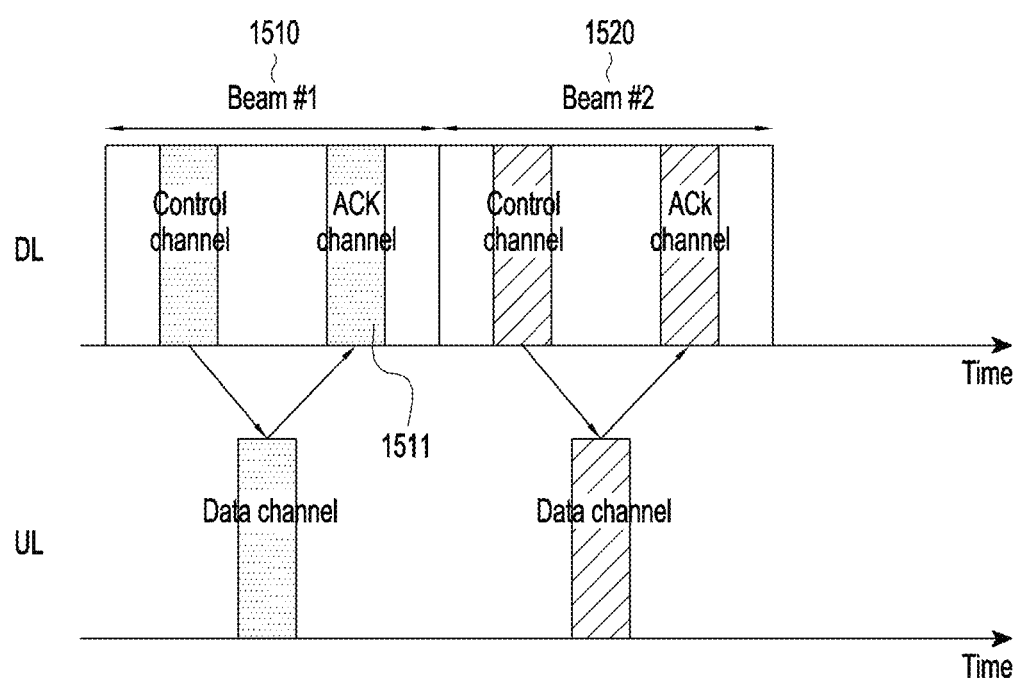
FIG. 15 is a view illustrating an example of maintaining a beam direction according to an embodiment.

FIG. 15 is a view illustrating an example of maintaining a beam direction according to an embodiment.

Described with reference to FIG. 15 is a scheme for minimizing or preventing resource loss at the inter-beam boundary which may arise due to beam switching.

Referring to FIG. 15, the base station may send control information to the UE located in beam direction #1 and may then allocate as long a transmission time 1510 for the beam direction #1 as the beam direction can remain the beam direction #1 until the base station receives an ACK signal 1511 from the UE.

Upon receiving an ACK signal 1511 from the UE located in beam direction #1, the base station may perform beam switching (switch beams) to a different beam direction, e.g., the beam direction #2. For example, the base station may allocate the transmission time 1520 for the beam direction #2 to come later than the time when the base station may receive the ACK signal 1511 from the UE located in the beam direction #1. Such a method may prevent such a resource loss that may occur as described above in connection with FIG. 14.

In other words, it is provided herein a method for allocating resources when maximum uplink data retransmission may be completed during the period when a beam direction is maintained or when ACK/NACK channel transmission is possible in retransmission of some uplink data retransmission to prevent resource loss that may occur due to different beam directions between the control channel and uplink data channel upon switching beam directions.

Alternatively, uplink (UL) data transmission may commence when all HARQ transmissions (including retransmissions) can be completed within the period when a beam direction may remain. Further, when N UL HARQ retransmission can be completed within the period during which the beam direction remains, uplink data may begin transmission. For example, uplink control information retransmitted may be prevented from being lost due to beam switching by maintaining the beam direction for transmitting uplink (UL) control information until uplink control information is retransmitted N times. N may be previously determined or adjusted by, e.g., the controller.

Figure 16:
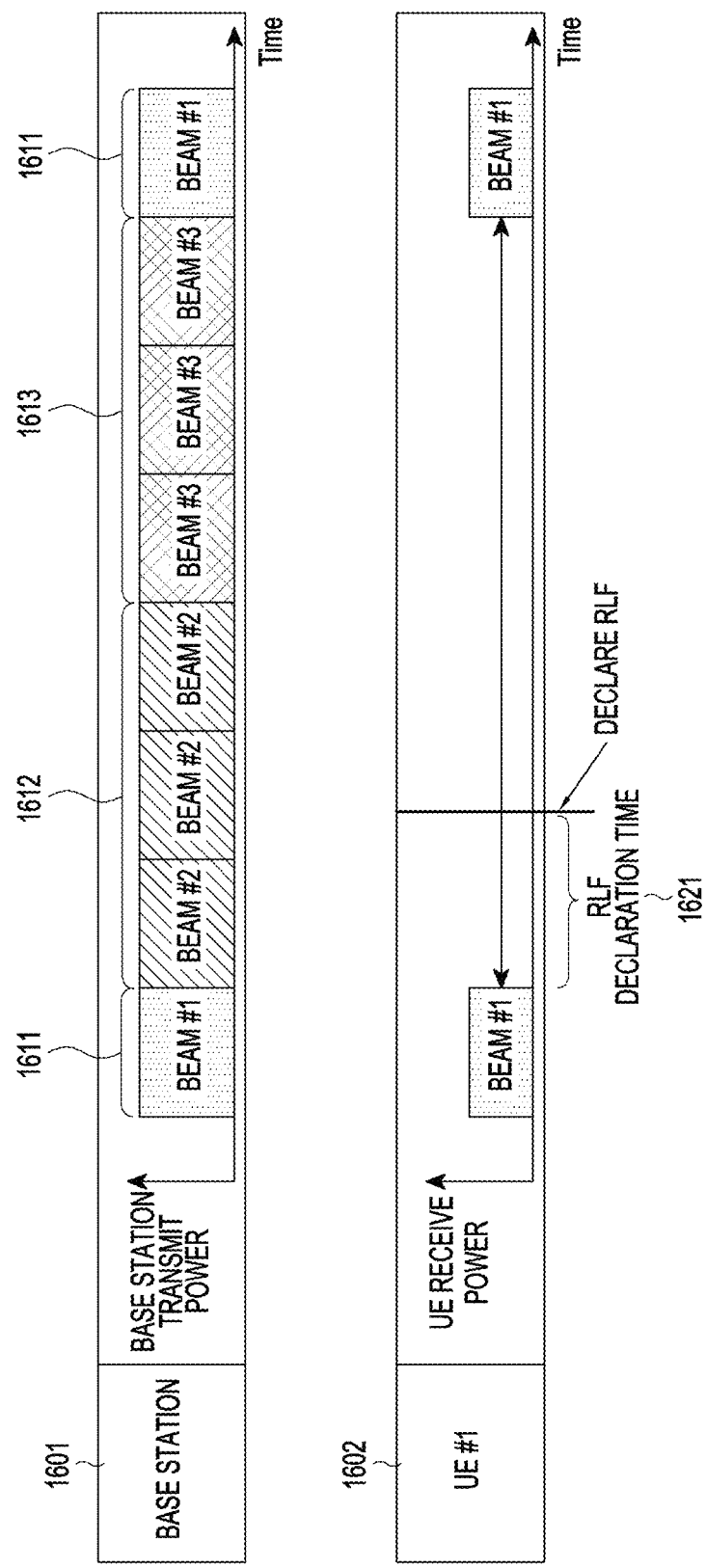
FIG. 16 is a view illustrating an example of a UE declaring an RLF while a base station switches beams.

FIG. 16 is a view illustrating an example of a UE declaring an RLF while a base station switches beams.

FIG. 16 illustrates a configuration of allocating resources 1611, 1612, and 1613 respectively mapped to transmit times for beamforming in the beam direction #1, the beam direction #2, and the beam direction #3.

Referring to FIG. 16, when the base station 1601 sends signals in a plurality of beam directions while switching beams, there may occur a period during which the UE 1602 located in each of the plurality of beam directions fails to receive a signal. When the UE 1602 fails to receive a signal during a predetermined time 1621 or longer during the course, the UE 1602 may declare a radio link failure (RLF) and disconnect the call.

FIG. 16 illustrates an example in which the base station 1601 sequentially performs beamforming in the beam direction #1, beam direction #2, n3, and beam direction #1. It is hypothesized that when the base station 1601 performs beamforming in the beam direction #1, the UEs located in the beam direction #2 fail to receive a signal from the base station. UE #1 1602 located in beam direction #1 fails to receive a beam while the base station 1601 radiates beams in the beam direction #2, and when the time during which UE #1 1602 located in the beam direction #1 fails to receive a beam is longer than a predetermined reference time (e.g., an RLF declaration time) 1621, UE #1 1602 may declare an RLF and disconnect the call connected with the base station 1601.

However, keeping a call longer may be more advantageous to FWA or other base station-containing systems in light of stability. In other words, FWA systems may be better off letting the call connection continue even though it may cause a temporary drop in transmission or reception.

The disclosure thus provides herein a scheme for maintaining a call as long as possible to prevent an RLF from being frequently declared due to beam switching, which is described below with reference to FIG. 17.

Figure 17:
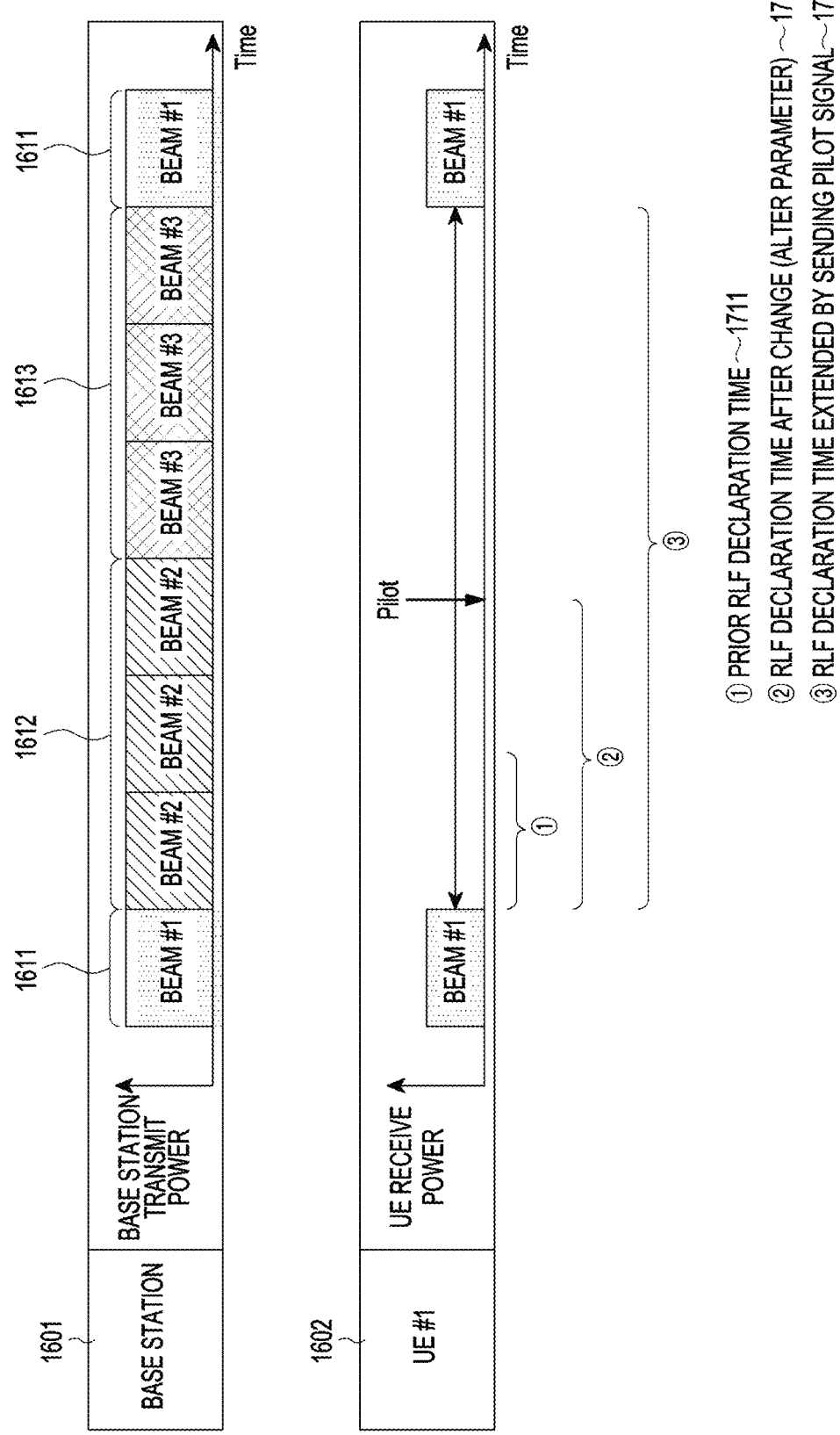
FIG. 17 is a view illustrating an example of maintaining a call in a beam switching system according to an embodiment.

FIG. 17 is a view illustrating an example of maintaining a call in a beam switching system according to an embodiment.

Referring to FIG. 17, it is provided a scheme for maximizing the RLF declaration time by parameter adjustment 1712 and intermittent transmission 1710 of pilot signals to prevent a UE 1602 from declaring an RLF even when the UE 1602 fails to receive a signal from a base station 1601 during a predetermined time.

For example, the RLF declaration time 1711 may be extended to an RLF declaration time 1712 by setting such parameters, as the number of consecutive out-of-sync or an RLF timer in the specification, to the maximum to prevent the UE 1601 from declaring an RLF even though receiving a signal during a predetermined time 1711 fails.

As another example, the base station 1620 may intermittently send pilot signals in the beam direction along which no transmission is made during a predetermined time to induce the UE's RLF timer to reset, thereby preventing the UE from declaring an RLF. The pilot signals may trigger the RLF timer to be reset. The RLF declaration time 1713 extended by the method of sending pilot signals may be longer than the prior RLF declaration time 1711.

As set forth above, maintaining a call connection longer may benefit FWA systems in light of stability. FWA systems may be better off letting the call connection continue even though it may cause a temporary drop in transmission or reception.

Figure 18:
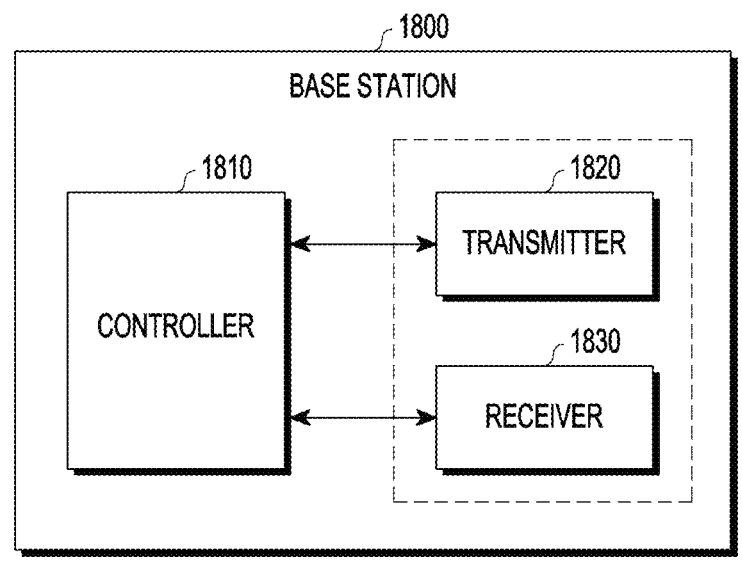
FIG. 18 is a block diagram illustrating an exemplary configuration of a base station according to an embodiment.

FIG. 18 is a block diagram illustrating a configuration of a base station according to an embodiment.

Referring to FIG. 18, according to the disclosure, a base station 1800 may include a controller 1810, a transmitter 1820, and a receiver 1830. The base station 1800 may add more elements. As necessary or optionally, any one or more of the controller 1810, the transmitter 1820, and the receiver 1830 may be omitted.

The controller 1810 may control a series of operations to allow the base station 1800 to operate as per the above-described embodiments. For example, according to an embodiment, the controller 1810 may differently control the operations as per, e.g., the method for beamforming in different beam directions with different time periods allocated, the method for adjusting transmission time proportions for beamforming per beam direction, and the method for determining the location (distance or beam direction) of UEs. As necessary, the controller 1810 may perform control to transmit various additional indicators and configuration information. Meanwhile, as an example, the controller 1810 may include at least one processor (e.g., a central processing unit (CPU) or a graphics processing unit (GPU) or both).

The transmitter 1820 and the receiver 1830 may collectively be referred to as a transceiver (or communication interface) according to an embodiment. The transceiver may transmit or receive signals to/from the UE. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the controller 1810, and transmit signals output from the controller 1810 via a radio channel. Meanwhile, the controller 1810 may control the operations of the base station according to a combination of at least one or two or more of the above-described embodiments of the disclosure.

The base station 1800 may further include a storage unit configured to store a basic program for operating the base station 1800, application programs, control information or other data. The controller 1810 may perform various operations using various programs, contents, or data stored in the storage unit.

Figure 19:
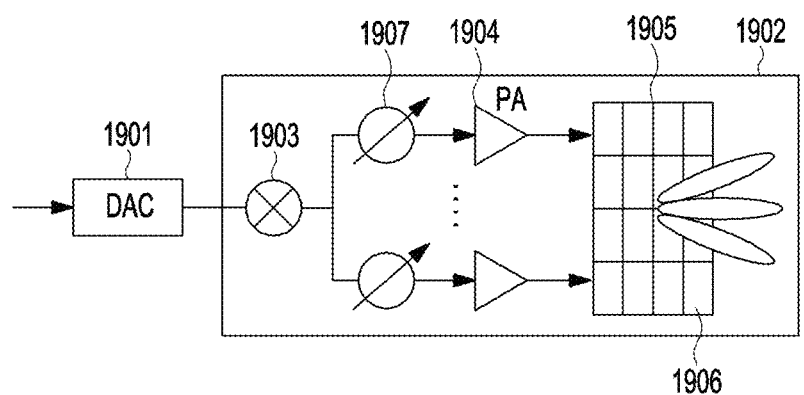
FIG. 19 is a view illustrating an exemplary structure of an analog beamforming unit of a transmitter according to an embodiment.

FIG. 19 is a view illustrating an exemplary structure of an analog beamforming unit of a transmitter according to an embodiment of the present disclosure.

A transmitter may convert a digital signal that it intends to transmit into an analog signal using a digital-to-analog converter (DAC) 1901 and input the analog signal to an analog beamforming unit 1902. The analog signal input to the analog beamforming unit 1902 is used for beamforming using an antenna 1905. The analog beamforming unit 1902 may include, e.g., a mixer 1903, a phase shifter 1907, a power amplifier (PA) 1904, and an antenna array 1905. Each antenna 1906 in the antenna array 1905 may be connected to the PA 1904.

Figure 20:
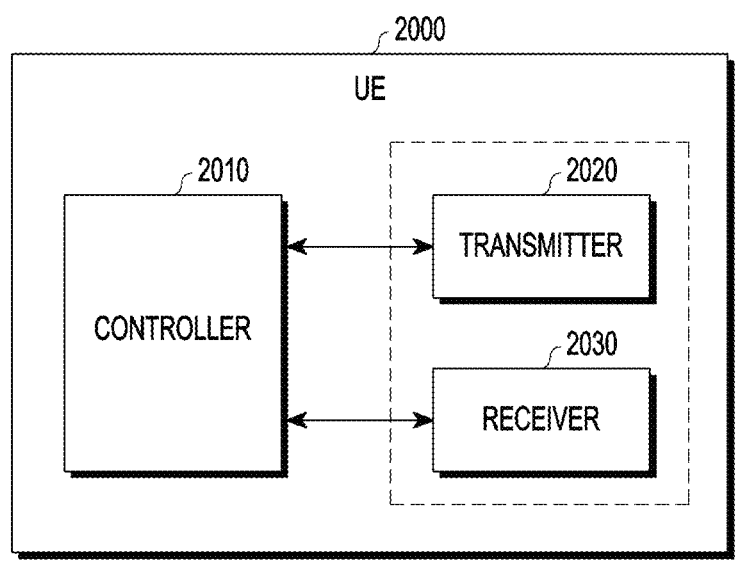
FIG. 20 is a block diagram illustrating an exemplary configuration of a UE according to an embodiment.

FIG. 20 is a block diagram illustrating a configuration of a UE according to an embodiment.

Referring to FIG. 20, according to the disclosure, a UE 2000 may include a controller 2010, a transmitter 2020, and a receiver 2030. The base station 1800 may add more elements. As necessary or optionally, any one or more of the controller 2010, the transmitter 1820, and the receiver 2030 may be omitted.

The controller 2010 may control a series of operations to allow the UE 2000 to operate as per the above-described embodiments. For example, when the base station performs beamforming, i.e., radiates a beam, according to an embodiment, the controller 2010 may control the components of the UE 2000 to decode the radiated beam and process signals (e.g., control information or data) contained in the beam. Meanwhile, as an example, the controller 2010 may include at least one processor (e.g., a central processing unit (CPU) or a graphics processing unit (GPU) or both).

The transmitter 2020 and the receiver 2030 may collectively be referred to as a transceiver (or communication interface) according to an embodiment. The transceiver may transmit or receive signals to/from the base station. The signals may include control information and data. To that end, the transceiver may include a radio frequency (RF) transmitter for frequency-up converting and amplifying signals transmitted and an RF receiver for low-noise amplifying signals received and frequency-down converting the frequency of the received signals. The transceiver may receive signals via a radio channel, output the signals to the controller 2010, and transmit signals output from the controller 2010 via a radio channel. Meanwhile, the controller 2010 may control the operations of the UE according to a combination of at least one or two or more of the above-described embodiments of the disclosure.

The UE 2000 may further include a storage unit configured to store a basic program for operating the UE 2000, application programs, control information or other data. Further, the storage unit may include at least one storage medium of a flash memory-type, hard disk-type, multimedia card-type, a micro card-type, or other-type memory (e.g., a secure digital (SD) or an extreme digital (xD) memory), a magnetic memory, a magnetic disk, an optical disc, a random access memory (RAM), a static RAM (SRAM), a read only memory (ROM), a programmable ROM (PROM), or an electrically erasable PROM (EEPROM). The controller 2010 may perform various operations using various programs, contents, or data stored in the storage unit.

As described herein, various components or modules in the server or terminal device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

As is apparent from the foregoing description, the disclosure provides technologies for obtaining a beamforming gain or expanding coverage for control channels.

The disclosure also provides technologies for efficiently controlling the base station performing beamforming on UEs located in multiple beam directions.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for performing beamforming by a base station in a wireless communication system, the method comprising:
    obtaining transmission time proportions allocated to each of a plurality of beam directions based on a first number of in-coverage active user equipments (UEs) belonging to each beam direction and a second number of extended-coverage active UEs; and
    performing beamforming to send control information in each of the plurality of beam directions based on the obtained transmission time proportions,
    wherein the transmission time proportions are determined in proportion to the second number of extended-coverage active UEs belonging to each beam direction, and
    wherein the transmission time proportion allocated to a first beam direction from among the plurality of beam directions is determined based on a ratio of a third number of extended-coverage active UEs belonging to the first beam direction to a sum of the first number of in-coverage active UEs belonging to each beam direction.

2. The method of claim 1, wherein obtaining the transmission time proportions includes obtaining the transmission time proportions by considering a beam direction related to the extended-coverage active UEs.

3. The method of claim 2, wherein obtaining the transmission time proportions includes obtaining the transmission time proportions by considering at least one or more of an amount of transmission required by a user equipment (UE), spectral efficiency, or resources allocated to a user equipment (UE).

4. The method of claim 1, further comprising:
    receiving a reference signal from a user equipment (UE);
    determining a path loss between the base station and the UE based on the received reference signal; and
    estimating a location of the UE based on the determined path loss.

5. The method of claim 4, wherein estimating the location of the UE includes estimating a distance between the base station and the UE based on the determined path loss or estimating whether the UE is located in coverage or out of coverage by comparing the determined path loss with a threshold.

6. The method of claim 1, further comprising maintaining a beam direction until receiving an acknowledgment (ACK) signal from a user equipment (UE).

7. The method of claim 1, further comprising maintaining a beam direction until receiving a predetermined number of retransmission request signals from a user equipment (UE).

8. The method of claim 1, further comprising sending a pilot signal to reset a timer related to declaring a link failure to a user equipment (UE) where a time for transmission in one beam direction as per the obtained transmission time proportions is longer than a link failure declaration time.

9. The method of claim 1, wherein the transmission time proportions are proportions of times during which each beam is radiated in each of the plurality of beam directions.

10. A base station configured to perform beamforming in a wireless communication system, comprising:
    a transceiver configured to perform beamforming communication with a user equipment (UE); and
    a processor configured to:
        obtain transmission time proportions allocated to each of a plurality of beam directions based on a first number of in-coverage active user equipments (UEs)

belonging to each beam direction and a second number of extended-coverage active UEs; and control beamforming for sending control information based on the obtained transmission time proportions, wherein the transmission time proportions are determined in proportion to the second number of extended-coverage active UEs belonging to each beam direction, and wherein the transmission time proportion allocated to a first beam direction from among the plurality of beam directions is determined based on a ratio of a third number of extended-coverage active UEs belonging to the first beam direction to a sum of the first number of in-coverage active UEs belonging to each beam direction.

11. The base station of claim 10, wherein the processor is configured to obtain the transmission time proportions by considering a beam direction related to the extended coverage active UEs.

12. The base station of claim 11, wherein the processor is configured to obtain the transmission time proportions by considering at least one or more of an amount of transmission required by a UE, spectral efficiency, or resources allocated to a UE.

13. The base station of claim 10, wherein the processor is configured to:

receive a reference signal from the UE;

determine a path loss between the base station and the UE based on the received reference signal; and estimate a location of the UE based on the determined path loss.

14. The base station of claim 13, wherein the processor is configured to estimate a distance between the base station and the UE based on the determined path loss or estimate whether the UE is located in coverage or out of coverage by comparing the determined path loss with a threshold.

15. The base station of claim 10, wherein the processor is configured to perform control to maintain a beam direction until receiving an acknowledgment (ACK) signal from the UE.

16. The base station of claim 10, wherein the processor is configured to perform control to maintain a beam direction until receiving a predetermined number of retransmission request signals from the UE.

17. The base station of claim 10, wherein the processor is configured to send a pilot signal to reset a timer related to declaring a link failure to the UE where a time for transmission in one beam direction as per the obtained transmission time proportions is longer than a link failure declaration time.

18. The base station of claim 10, wherein the transmission time proportions are proportions of times during which each beam is radiated in each of the plurality of beam directions.

* * * * *